United States Patent
Limame et al.

(10) Patent No.: US 11,140,372 B2
(45) Date of Patent: Oct. 5, 2021

(54) CAPTURING AND SYNCHRONIZING MOTION WITH RECORDED AUDIO/VIDEO

(71) Applicant: D-BOX TECHNOLOGIES INC., Longueuil (CA)

(72) Inventors: Ala Eddine Limame, St-Leonard (CA); Jean-Francois Menard, Boucherville (CA)

(73) Assignee: D-BOX TECHNOLOGIES INC., Longueuil (CA)

( * ) Notice: Subject to any disclaimer, the term of this patent is extended or adjusted under 35 U.S.C. 154(b) by 0 days.

(21) Appl. No.: 16/481,197

(22) PCT Filed: Jan. 26, 2018

(86) PCT No.: PCT/CA2018/050096
§ 371 (c)(1),
(2) Date: Jul. 26, 2019

(87) PCT Pub. No.: WO2018/137040
PCT Pub. Date: Aug. 2, 2018

(65) Prior Publication Data
US 2019/0373237 A1    Dec. 5, 2019

Related U.S. Application Data

(60) Provisional application No. 62/450,754, filed on Jan. 26, 2017.

(51) Int. Cl.
*H04N 9/87* (2006.01)
*G11B 27/30* (2006.01)
(Continued)

(52) U.S. Cl.
CPC ........... *H04N 9/8715* (2013.01); *G11B 27/30* (2013.01)

(58) Field of Classification Search
None
See application file for complete search history.

(56) References Cited

U.S. PATENT DOCUMENTS

| | | | |
|---|---|---|---|
| 6,604,064 B1 * | 8/2003 | Wolff | G09B 19/00 434/21 |
| 6,710,713 B1 * | 3/2004 | Russo | A63B 24/0021 340/573.1 |

(Continued)

FOREIGN PATENT DOCUMENTS

WO    2013125773 A1    8/2013

OTHER PUBLICATIONS

Lex Fridman et al., Automated Synchronization of Driving Data Using Vibration and Steering Events, Pattern Recognition Letters, Elsevier, Mar. 1, 2016, © 2016 Elsevier Ltd. All rights reserved, pp. 1-8.

*Primary Examiner* — Hung Q Dang
(74) *Attorney, Agent, or Firm* — Norton Rose Fulbright Canada LLP

(57) ABSTRACT

The present disclosure provides methods and systems for synchronizing motion data with an audio/video stream. An audio/video stream, which comprises at least one timing marker, is obtained. The audio/video stream is processed to detect the at least one timing marker. Motion data associated with the audio/video stream and timing information for the motion data are obtained, the timing information including timing information regarding the at least one timing marker. The audio/video stream, with the at least one timing marker detected, and the motion data, are output with the timing information.

23 Claims, 3 Drawing Sheets

(51) Int. Cl.
*H04N 21/43* (2011.01)
*H04N 21/414* (2011.01)
*H04N 21/422* (2011.01)
*H04N 21/4223* (2011.01)
*H04N 21/8547* (2011.01)

(56) References Cited

U.S. PATENT DOCUMENTS

| | | |
|---|---|---|
| 8,400,548 B2 | 3/2013 | Bilbrey et al. |
| 8,941,723 B2 | 1/2015 | Bentley et al. |
| 9,007,523 B2 | 4/2015 | Choi et al. |
| 9,076,041 B2 | 7/2015 | Bentley et al. |
| 9,138,656 B2 | 9/2015 | Paillard |
| 9,235,765 B2 | 1/2016 | Bentley et al. |
| 9,418,705 B2 | 8/2016 | Kaps et al. |
| 10,292,647 B1* | 5/2019 | Uehara ............... A61B 5/1128 |
| 2004/0054512 A1 | 3/2004 | Kim et al. |
| 2006/0256234 A1 | 11/2006 | Roy et al. |
| 2007/0271104 A1* | 11/2007 | McKay ............... G10L 13/047 |
| | | 704/270.1 |
| 2008/0297654 A1* | 12/2008 | Verberkt ............... G06T 1/0021 |
| | | 348/500 |
| 2010/0164862 A1* | 7/2010 | Sullivan ............... G06T 7/246 |
| | | 345/156 |
| 2010/0238168 A1* | 9/2010 | Kim ............... G06T 17/00 |
| | | 345/420 |
| 2011/0305369 A1* | 12/2011 | Bentley ............... G06K 9/00624 |
| | | 382/103 |
| 2012/0294594 A1 | 11/2012 | Hsiao |
| 2013/0036353 A1 | 2/2013 | Zavesky et al. |
| 2013/0038792 A1* | 2/2013 | Quigley ............... A61H 19/00 |
| | | 348/515 |
| 2013/0130843 A1* | 5/2013 | Burroughs ............... A63B 71/0686 |
| | | 473/415 |
| 2013/0329072 A1* | 12/2013 | Zhou ............... G06T 3/4038 |
| | | 348/222.1 |
| 2013/0336628 A1* | 12/2013 | Lamb ............... H04N 9/79 |
| | | 386/224 |
| 2014/0093221 A1* | 4/2014 | Wikander ............... H04N 9/8205 |
| | | 386/248 |
| 2014/0205260 A1* | 7/2014 | Lacroix ............... H04N 5/77 |
| | | 386/201 |
| 2015/0121436 A1* | 4/2015 | Rango ............... G11B 27/10 |
| | | 725/88 |
| 2015/0189223 A1* | 7/2015 | Levesque ............... H04N 5/9305 |
| | | 386/227 |
| 2015/0256689 A1 | 9/2015 | Erkkila et al. |
| 2015/0277550 A1* | 10/2015 | Legakis ............... H04N 5/23219 |
| | | 345/156 |
| 2015/0324636 A1* | 11/2015 | Bentley ............... G11B 27/17 |
| | | 386/227 |
| 2016/0006935 A1* | 1/2016 | Zhou ............... H04N 5/23258 |
| | | 348/208.1 |
| 2016/0023125 A1 | 1/2016 | Senecal et al. |
| 2016/0250490 A1* | 9/2016 | Hoffman ............... A61B 5/0205 |
| | | 607/60 |
| 2016/0270712 A1 | 9/2016 | Clancy et al. |
| 2016/0361637 A1* | 12/2016 | Higgins ............... A63F 13/24 |
| 2017/0004358 A1* | 1/2017 | Bose ............... G06F 3/0346 |
| 2017/0134694 A1* | 5/2017 | Cho ............... G06K 9/00315 |
| 2017/0168571 A1* | 6/2017 | Levesque ............... G06F 3/016 |
| 2017/0336220 A1* | 11/2017 | Broaddus ............... G06T 7/285 |
| 2017/0359518 A1* | 12/2017 | de Foras ............... H04N 5/23258 |
| 2018/0296163 A1* | 10/2018 | DeBusschere ............... A61B 5/721 |
| 2018/0353836 A1* | 12/2018 | Li ............... G09B 19/0038 |

\* cited by examiner

CAPTURING AND SYNCHRONIZING MOTION WITH RECORDED AUDIO/VIDEO

TECHNICAL FIELD

The present disclosure relates to a method and system for capturing motion data associated with an audio/video recording, and for synchronizing the motion data with the audio/video recording at playback.

BACKGROUND OF THE ART

In the evolution of consumer electronics, video cameras have become readily available in many configurations, at relatively low cost. This has led to a widespread use of such cameras. Among the uses, it has become a trend for users to record action footage in which they are involved, for instance when performing leisure or athletic activities. For example, the driver of a vehicle many record a car drive on a scenic road, or a downhill skier may record a run, with the video camera, known as action camera, recording dynamic images and audio of the environment in which the user is immersed.

In parallel, motion simulators performing vibro-kinetic effects are commonly used to enhance a viewing experience of a video program. In such technology, a motion simulator features a seat or platform that is displaced by actuators in vibro-kinetic effects in synchronization with an audio-visual program or visual event. In a particular type of such motion simulators, the motion simulators may move based on motion signals that are encoded as a motion track, in contrast to vibrations being extracted from a soundtrack of an audio-visual program.

It would be desirable to use motion simulators to add vibro-kinetic effects to action camera audio/video recordings.

SUMMARY

It is an aim of the present disclosure to provide a novel method for capturing motion data associated with an audio/video recording, and for synchronizing the motion data with the audio/video recording at playback.

It is a further aim of the present disclosure to provide a novel system for capturing motion data associated with an audio/video recording, and for synchronizing the motion data with the audio/video recording at playback.

In accordance with a broad aspect, there is provided a method for synchronizing motion data with an audio/video stream. At least one timing marker is produced for capture in the audio/video stream. The audio/video stream, which comprises the at least one timing marker, is obtained. The audio/video stream is processed to detect the at least one timing marker. Motion data associated with the audio/video stream and timing information for the motion data are obtained, the timing information including timing information regarding the at least one timing marker. The motion data is synchronized with the audio/video stream based on the timing information and the at least one timing marker detected in the audio/video stream.

In accordance with a broad aspect, there is provided a method for synchronizing motion data with an audio/video stream, comprising: obtaining the audio/video stream, the audio/video stream comprising at least one timing marker; processing the audio/video stream to detect the at least one timing marker; obtaining motion data associated with the audio/video stream, and timing information for the motion data, the timing information including timing information regarding at least one timing marker; and outputting the audio/video stream with the at least one timing marker detected, and motion data with said timing information.

In some embodiments, obtaining the motion data comprises capturing the motion data via at least one motion sensor, starting substantially contemporaneously with the producing the at least one timing marker.

In some embodiments, the method further comprises synchronizing the motion data with the audio/video stream based on the timing information and the at least one timing marker detected in the audio/video stream, whereby outputting the audio/video stream includes outputting the motion data synchronized with the audio/video stream.

In some embodiments, synchronizing the motion data comprises producing a synchronized-motion file by altering the timing information of the motion data to align with the audio/video stream based on the at least one timing marker.

In some embodiments, the method further comprises producing a timing file comprising a mapping of the motion data to the audio/video stream based on the synchronizing.

In some embodiments, the method further comprises outputting the motion data synchronized with a playback of the audio/video stream.

In some embodiments, outputting the motion data comprises causing movement in at least one motion system based on the motion data.

In some embodiments, the method further comprises producing a motion file comprising instructions for causing movement in at least one motion system, the motion file based on the motion data and aligned with the audio/video stream.

In some embodiments, synchronizing the motion data with the audio/video stream comprises aligning data points of the motion data with the at least one timing marking in the audio/video stream.

In some embodiments, aligning data points of the motion data with the at least one timing marking in the audio/video stream comprises aligning a zero-point of the motion data with a corresponding zero-point of the audio/video stream.

In some embodiments, the method further comprises producing at least one timing marker for capture in the audio/video stream when obtaining the audio/video stream.

In some embodiments, producing the at least one timing marker comprises producing the at least one timing marker in response to a user input.

In some embodiments, outputting the audio/video stream with the at least one timing marker detected includes adjusting the timing information of the motion data and outputting the adjusted motion data synchronized with the audio/video stream.

In accordance with a further broad aspect, there is provided a synchronization system for synchronizing motion data with an audio/video stream. The system comprises a marker detection module for obtaining an audio/video stream comprising at least one timing marker; and for processing the audio/video stream to detect the at least one timing marker; and a synchronization module for obtaining motion data associated with the audio/visual stream, and timing information for the motion data, the timing information including timing information regarding the at least timing marker; and for synchronizing and outputting the motion data with audio/visual stream by aligning data points of the motion data with the audio/video stream using the timing information and the identified at least one timing marker.

In some embodiments, the synchronization device further configured for producing a timing file comprising a mapping of the motion data to the audio/video stream based on the synchronizing.

In some embodiments, the synchronization device further configured for outputting the motion data synchronized with a playback of the audio/video stream.

In some embodiments, outputting the motion data comprises causing movement in at least one motion system based on the motion data.

In some embodiments, the synchronization device further configured for producing a motion file comprising instructions for causing movement in at least one motion system, the motion file based on the motion data and aligned with the audio/video stream.

In some embodiments, the synchronization module for synchronizing the motion data comprises aligning data points of the motion data with the at least one timing marking in the audio/video stream.

In some embodiments, aligning data points of the motion data with the at least one timing marking in the audio/video stream comprises aligning a zero-point of the motion data with a corresponding zero-point of the audio/video stream.

According to another broad aspect, there is provided a synchronization system for synchronizing motion data with an audio/video stream, comprising: a synchronization device; and a motion capture device, comprising: a timing marker generator for producing the at least one timing marker for capture in the audio/video stream; and a motion sensor for capturing the motion data, starting substantially contemporaneously with the producing of the timing marker.

In some embodiments, the motion capture device further comprises a user input, wherein the timing marker generator is configured for producing the at least one timing marker in response to actuation of the user input.

Features of the systems, devices, and methods described herein may be used in various combinations, and may also be used for the system and computer-readable storage medium in various combinations

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Figure 1:
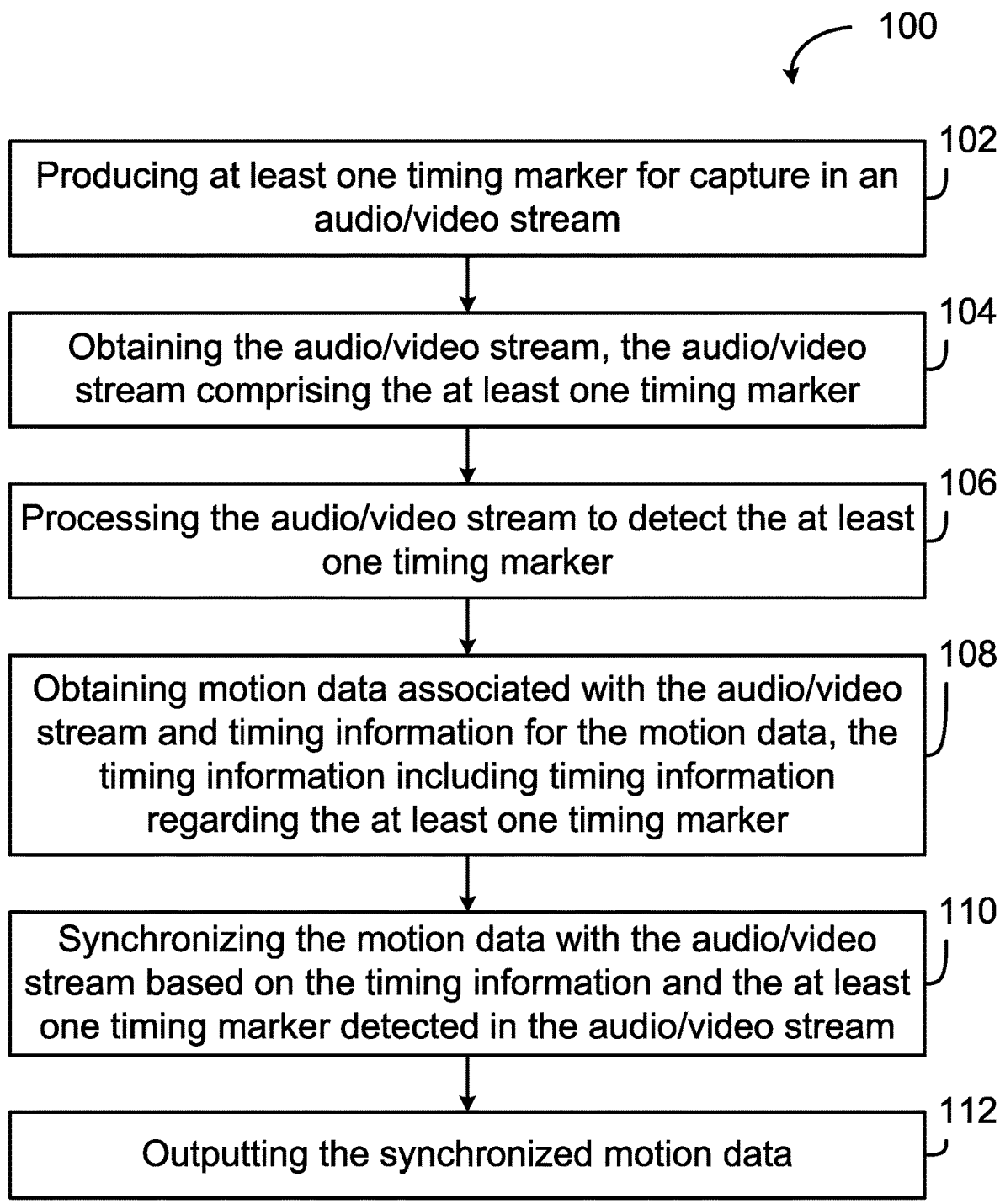
FIG. 1 is flowchart illustrating a method for capturing and synchronizing motion data with an audio/video stream.

With reference to FIG. 1, there is provided a method 100 for capturing and synchronizing motion data (also called motion sensor data) with at least one of an audio stream and a video stream. To simplify the description, the term "audio/video stream" will be used herein, but it should be understood that the motion data can be synchronized with any of one or more audio stream, one or more video stream, or any suitable combination of audio and video streams. The motion data is produced by motion sensors as a result of actions occurring during the recording of the audio/video stream, and may hence be referred to as motion sensor data, but for simplicity reference is made herein to motion data. The motion sensors may be accelerometers, gyrometers or gyroscopes, magnetometers, position sensors, GPS-based sensors, or any suitable combination thereof.

At step 102, at least one of an audio signal and a visual signal, hereinafter a "timing marker", is produced based on timing information. The at least one timing marker can be produced by a speaker, screen, light, or other like component. The at least one timing marker is produced in such a way as to be captured by at least one recording device, which may be a camera (e.g., action camera), a microphone, or any other suitable recording device which is configured to capture an audio/video stream. The timing information can be any suitable representation of one or more moments in time when the signal is produced. For example, the timing information can be an absolute time, a relative time, a clock cycle count, a GPS clock count, sampling or processing rate or any other suitable representation.

In some embodiments, the timing marker is an audio ping, chime, or chirp, which may or may not be perceptible to human hearing. In other embodiments, the timing marker is a light flash, a light blinking pattern, a light that varies in wavelength or amplitude, or other suitable light emission which may or not be perceptible to the human eye (e.g., an infrared or ultraviolet emission). In further embodiments, the timing marker is a bar code, QR code, or other visual pattern displayed on a screen which is held up in front of the recording device so that the audio/video stream captured by the recording device includes the visual pattern as timing marker. In still other embodiments, the timing marker is any suitable other signal, or any combination of the signals listed hereinabove.

In certain embodiments, the timing marker is produced in response to a user input. For example, a user may press a button, touchscreen or other input device in order to indicate that a timing marker should be produced. In other embodiments, a smartphone or other mobile device can be used to indicate that the timing marker is to be produced, or may be used to produce the timing marker, for example via Bluetooth® or any other suitable wireless protocol. Still other ways of providing an indication to produce the timing marker are considered. The timing marker may be produced a predetermined number of times (for example at the start of the recording only), or may be produced substantially continuously. For example, a visual timing marker can be produced five times following receipt of a user input, then once every two minutes thereafter. In another example, an audio timing marker is produced every 30 seconds following receipt of a user input, and continues until a subsequent user input is received.

In some embodiments, the timing marker, whether audial or visual, is a time-varying timing marker, which varies in form and/or type over time. A visual timing marker, for example a QR code, can vary with time, such that the pattern displayed via the QR code varies several times per second, every second, every few seconds, and the like. In some cases, the refresh rate for the QR code, that is the time between subsequent visual patterns, can be selected so as to be non-synchronous with the refresh rate of the device capturing the timing marker, for example the camera. If the camera is known to have a refresh rate of 24 frames-per-second (FPS), 60 FPS, or 120 FPS, the refresh rate for the QR code can be selected to have a period which does not line up with the refresh rate of the camera. For instance, the QR code can be made to change every 1003 milliseconds (0.997 FPS), so that changes in the QR code take place between adjacent frames as captured by the camera. This can be used to improve the precision of detection of the timing marker in the video stream captured by the camera, as explained in greater detail hereinbelow. Similar considerations can be applied for audio timing markers, in which the frequency, or pitch, etc., of an audio timing marker can vary with time.

At step 104, the audio/video stream, which includes the timing marker, is obtained. The audio/video stream can be obtained from a capture device, for instance a camera, a sound recorder, and the like, from a storage medium, for instance a database, hard drive, or memory drive, from a remote source, for instance a server, a database, a web service, or from any other suitable source. In some embodiments, the audio/video stream comprises both an audio stream and a video stream. In other embodiments, only one of an audio stream and a video stream is obtained. In still further embodiments, separate audio and video streams are obtained, which can be combined or processed separately, as appropriate.

At step 106, according to an embodiment, the audio/video stream captured by the recording device in 102 and 104 is processed to detect the captured timing marker(s). The captured timing marker(s) obtained from the audio/video stream are indicative of moment(s) in the audio/video stream where a representation of the timing marker produced at step 102 was captured by the recording device in the audio/video stream. Thus, the audio/video stream is processed to detect the timing marker(s) in the form of an audible and/or visible representation captured by the recording device. When such timing marker(s) is (are) found, timing information is derived from the audio/video stream, for example by way of frame frequency information for one or more frames of the audio/video stream in which the representations are found, or in any suitable way.

The timing marker(s) produced at step 102 can be detected in the audio/video stream using any suitable audio and/or video processing techniques. In some embodiments, the timing marker produced at step 102 is an audio chirp having a predetermined frequency and duration which is repeated a predetermined number of times at a predetermined interval. For example, a 200 ms chirp at 21 kHz (kilo-hertz) is repeated 10 times at 500 ms intervals. In this example, an audio filter can be used to remove all sounds outside of a range including 21 kHz and thereby determine the location of the chirps in the audio/video stream. Frame frequency information pertaining to the frames in which the chirp is found in the audio/video stream can then be used to obtain the timing information. Similar techniques can be applied to different sound-based patterns. For example, audio chirps can encode additional elements of the timing information in the timing markers by varying the frequency of the chirps, combining multiple frequencies in the chirps, by varying the interval between the chirps, and the like. Additionally, image processing techniques can be applied to detect visible representations of visual timing marker present in the audio/video stream. For example, the image processing techniques can detect a two-dimensional bar code (or QR-code) in the audio/video stream, a GPS clock time value, etc. The QR-code can represent an encoded timestamp which can be processed to obtain the captured timing marker(s), and in some cases can change at certain intervals. In some embodiments, the refresh rates of the timing markers are selected to be non-synchronous with the rate-of-capture of the device capturing the timing marker. For example, a visual timing marker varying every 1003 milliseconds can ensure that the transition from one timing marker to the next occurs between subsequent frames in a video stream, which can improve accuracy in determining the presence of the timing marker, and a time of transition therefor.

At step 108, motion data associated with the audio/video stream is obtained. Timing information for the motion data, including timing information regarding the at least one timing marker, is also obtained. In some embodiments, the motion data is captured, for example via at least one motion sensor. Capture of the motion data can begin substantially contemporaneously with the production of the timing marker at step 102, or at a predetermined time thereafter, with a calculated known delay. The motion data and the audio/video stream, featuring in an instance the timing marker(s), are captured simultaneously and respectively by the motion sensor and the recording device, and the producing of 102 can be performed simultaneously with the capture of 104, for timing markers to be present periodically throughout the audio/video stream capture of 104. The motion data is then stored in association with the timing information on which is based the production of the audio and/or visual signal of step 102. The motion data can be stored in any suitable database or other storage medium, as is described in greater detail hereinbelow, and can be stored in association with the timing information in any suitable fashion, for example via tags, metadata, pointers, and the like.

The motion data is representative of forces, accelerations and/or angular rates of changes along one or more axes felt by the motion sensor(s). For example, if the motion sensor is dropped to the ground, the motion data may indicate downward force and/or an acceleration toward the ground, followed by a force or acceleration away from the ground as the motion sensor impacts the ground, i.e., with reference to a coordinate system. When located proximate or on the recording device, the motion data can be representative of the forces and/or accelerations felt by the recording device, or a user holding, wearing, or using the recording device. The duration of the capture of motion data and audio/video stream has any appropriate duration, based on the user's desire and the storage capacity of the device incorporating the motion sensors and the recording device. It is pointed out that the method 100 may be effected without 102, such that the audio/video stream would be without the timing marker(s).

Step 108 may further include generating a motion simulation track based on the synchronized motion data. The motion simulation track may comprise motion samples representative of the motion data, but taking into consideration the available degrees of freedom available at the motion simulator. For example, the motion sensors may capture motion data about more degrees of freedom than are available at the motion simulator. The generation of the motion simulation track at 108 therefore simulates or approximates actions occurring in the motion data, as opposed to reproducing the motion data. According to an embodiment, step 108 includes seeking motion samples from a motion sample database as a function of the details of actions occurring in the motion data (e.g., magnitude, direction). For example, step 108 may detect a jump and landing in a skiing activity from the motion data, and have equivalent airborne and landing samples in the motion sample database. Likewise, in the case of a vehicle, turns in road curves may be detected in the motion data, and such movements may be reproduced in the form of motion samples in the motion simulation track. In accordance with yet another embodiment, the generation of the motion simulation track may be based on the audio/video stream. A processing of the images of the video stream may enable the detection of jump and landing, or a turn, etc., and may therefore be used for the generation of a motion simulation track. The audio stream may be used in conjunction with the processing of the images of the video stream to help detect the actions occurring in the audio/video stream. Alternatively, the motion simulation track may be generated at the motion platform using the motion data as synchronized with the audio/video stream in step 108.

At step 110, in an embodiment, motion data is synchronized with the audio/video stream based on the timing information of the captured motion data and on the timing marker(s) on the audio/video stream. In some embodiments, the motion data captured at step 104 is synchronized such that data points in the motion data at moments in time when the timing marker(s) were produced at step 102 are aligned in time with data points of the timing marker(s) in the audio/video stream. In some embodiments, the motion data is modified such that the associated timing information is adjusted to align the data points in the motion data with the data points in the audio/video stream. In other embodiments, the motion data is modified such that the associated timing information is reset so that a first data point having timing information indicative of a produced timing marker is set as a "time=0" point. Alternatively, the audio/video stream can be synchronized with the motion data, such that timing characteristics of the audio/video stream are altered to be aligned with the motion data. In embodiments where the motion data obtained at step 108 is a collection of discrete motion events, step 110 can include realigning or repositioning the discrete motion events to synchronize the motion data with the audio/video stream. In embodiments where the motion data is substantially continuous, for example a series of samples measured at a constant rate, step 110 can include applying one or more resampling techniques, one or more stretching or compression techniques, and the like.

The synchronization may include calculations using the frame frequency of the audio/video stream and the time/clock and/or the sampling or processing rate of the motion sensors, calculations using GPS clocks of the motion sensor device and of the recording device, for example as captured from a QR code or other visual representation thereof, for synchronized playback of the motion data and the audio/video processing once one or more timing markers in the audio/video stream are aligned with the timing information associated to the motion data. Still other approaches for synchronizing the motion data are considered. For example, the alignment of the motion data can be done by stretching or compressing the time interval between data points in the motion data to align with the timing markers, particularly in cases where clock drift exists between the motion sensor device and the recording device. In some embodiments, the synchronized motion data, for example in a modified state based on the synchronization, may be stored in a database or other data storage medium.

At step 112, the synchronized motion data is output in one or more fashions. In some embodiments, the motion data is output simultaneously and in synchrony with the audio/video stream, for example to a motion simulator and an audio/video display system, respectively. The motion data may be in the form of a motion simulation track occupying one or more dedicated channels of a multi-channel audio/video stream. Step 112 may also include outputting the motion data only, but in synchrony with the audio/video stream being played back in parallel. For example, the audio/video stream may be output directly to the audio/video display system, with the method 100 performing steps 106 and 108 with a parallel audio/video stream. In still further embodiments, the motion data is output via the aforementioned motion simulation track, which can be synchronized with the audio/video stream. For example, the timing information for the motion data can be altered to align with the audio/video stream. In other embodiments, a timing file can be produced, which maps the motion data to the audio/video stream based on the synchronization performed at step 110. Step 112 may also include outputting the audio/video stream with the at least one timing marker detected, and motion data with the timing information, for the synchronizing step 110 to be performed subsequently, for instance in another device. Stated differently, step 112 can occur after step 108 and before step 110. Still other approaches for outputting the synchronized motion data are considered.

The synchronized motion data and the audio/video stream can be output in any suitable data format using any suitable transmission protocols. For example, the synchronized motion data and the audio/video stream are output over Universal Serial Bus (USB) and High-Definition Multimedia Interface (HDMI), respectively. In another example, the synchronized motion data and the audio/video stream are output over suitable wireless protocols, for example Bluetooth®, WiFi, and the like.

Thus, the motion data is synchronized with the audio/video stream captured by the recording device so that during playback, movement generated by a motion simulator or other motion system using the motion data or a motion simulation track is synchronized with the audio/video stream, and optionally displayed on a screen or monitor and/or replayed via speakers. This allows a viewer of the audio/video stream to enjoy a representation of forces experienced during the capture of the audio/video stream. The synchronized motion data and the audio/video stream can also be stored or edited prior to playback, relying on the synchronization achieved at step 108 at playback.

Figure 2:
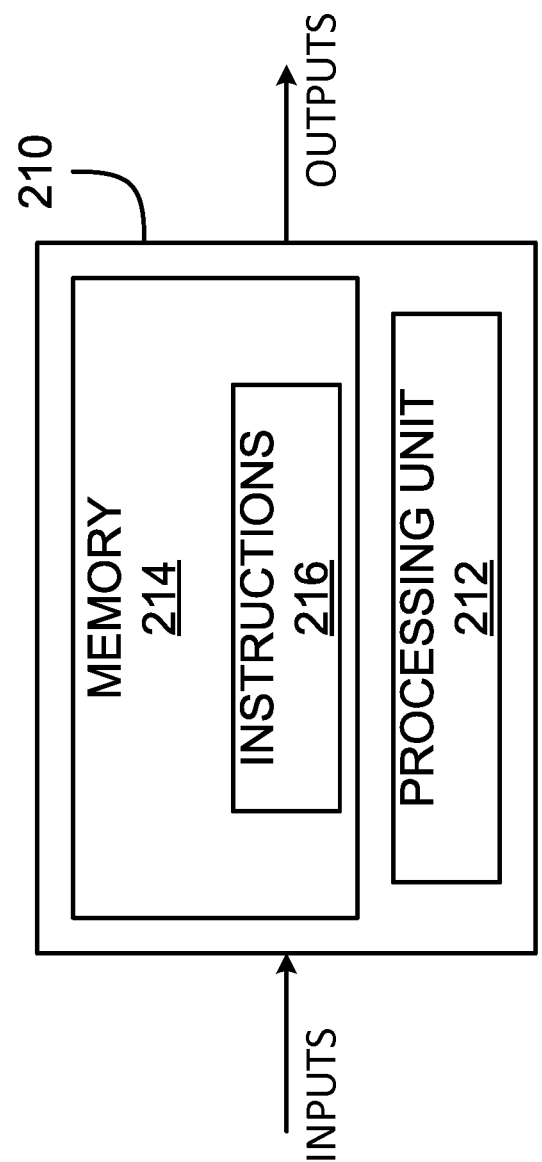
FIG. 2 is schematic diagram of an example computing system for implementing the method of FIG. 1 in accordance with an embodiment.

With reference to FIG. 2, the method 100 may be implemented by a computing device 210, comprising a processing unit 212 and a memory 214 which has stored therein computer-executable instructions 216. The processing unit 212 may comprise any suitable devices configured to cause a series of steps to be performed so as to implement the method 100 such that instructions 216, when executed by the computing device 210 or other programmable apparatus, may cause the functions/acts/steps specified in the methods described herein to be executed. The processing unit 212 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 214 may comprise any suitable known or other machine-readable storage medium. The memory 214 may comprise non-transitory computer readable storage medium, for example, but not limited to, an electronic, magnetic, optical, electromagnetic, infrared, or semiconductor system, apparatus, or device, or any suitable combination of the foregoing. The memory 214 may include a suitable combination of any type of computer memory that is located either internally or externally to the device 210, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 214 may comprise any storage means (e.g., devices) suitable for retrievably storing machine-readable instructions 216 executable by processing unit 212.

Figure 3:
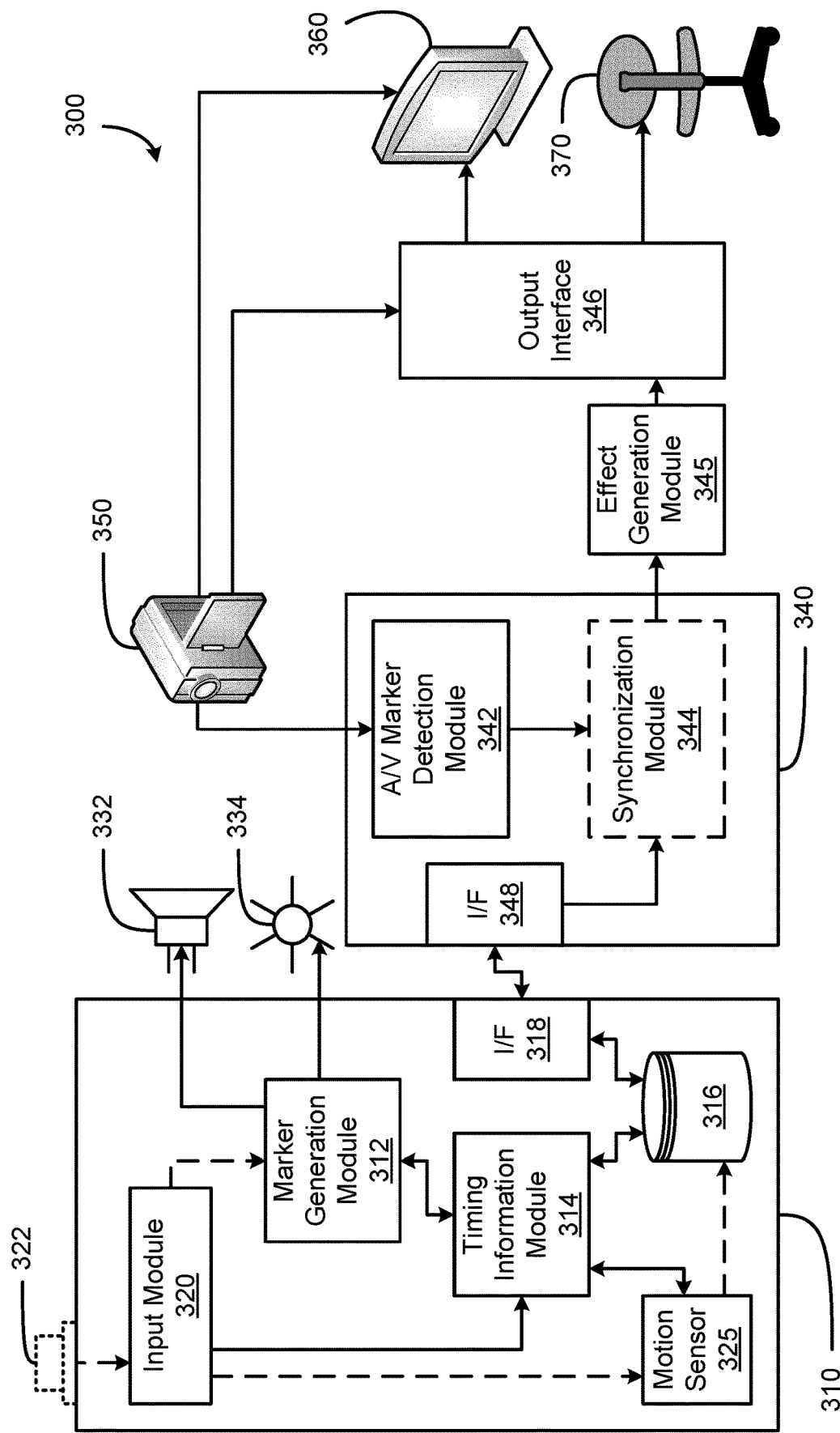
FIG. 3 is a block diagram of an example implementation of a system for capturing and synchronizing motion data with an audio/video stream.

With reference to FIG. 3, a system 300 for capturing and synchronizing motion data with an audio/video stream is shown. The system 300 comprises a motion capture device 310 and a synchronization device 340. Although in the example of FIG. 3 the motion capture device 310 and the synchronization device 340 are shown as two separate entities, in certain embodiments they may be a single common entity. In another embodiment, the motion capture device 310 and/or the synchronization device 340 has a configuration corresponding to that of the computing device 210 of FIG. 2. The system 300 is configured to interface or otherwise communicate with at least one recording device 350, which may be a camera, a microphone, a smartphone, or any other suitable recording device. Additionally, the system 300 is configured to provide output to an audio/video system 360 and a motion simulator 370 via an effect generator 345 and an output interface 346. The audio/video system 360 may include one or more screens and/or one or more speakers for displaying audio/video content. The motion simulator 370 can be any system capable of generating motion for experience by a user. For example, the motion simulator 370 is of the type having actuators (e.g., electro-mechanical actuators, pneumatic or hydraulic cylinders, etc.) supporting a platform or a seat, to displace same as a function of an actuation of the actuators. The motion simulator 370 may have any appropriate driver (e.g., processing unit, DSP) to convert the synchronized motion data and/or motion simulation track into a displacement of the platform or seat.

The motion capture device 310 includes a marker generation module 312, a timing information module 314, a database 316, an interface 318, an input module 320, and/or a motion sensor unit 325, featuring one or more motion sensors, such as inertial sensors, accelerometers, gyroscopes, GPS to name a few examples. The motion capture device 310 optionally includes a button or touchscreen, i.e., user interface 322, or other input device, and may also include a speaker 332 and/or a light source 334, or may be connected to one or both of the speaker 332 and the light source 334 via one or more connectors, which may be wired or wireless. In an embodiment, the touchscreen serves as both the input device 322 and as the light source 334.

The marker generation module 312 is configured for causing production of at least one timing marker via the speaker 332 and/or the light source 334, for example in accordance with step 102. The signal is produced to be captured by the recording device 350 as timing marker(s), and is related to timing information. In certain embodiments, the input module 320 receives a request to produce the audio and/or visual signal, for example via the button 322 or via a wired or wireless connection, and sends a message to the marker generation module 312 to instruct the marker generation module 312 to implement step 102.

The marker generation module 312 obtains the timing information from the timing information module 314. In some embodiments, the marker generation module 312 can request the timing information from the timing information module 314 prior to causing production of audio and/or visual signal. In other embodiments, the marker generation module 312 is previously provided with the timing information. The timing information may be derived from a clock (e.g. GPS clock), time, and/or sampling rate of the motion sensor unit 325 of the motion capture device 310, etc.

Additionally, the speaker 332 and the light source 334 can be any suitable speaker and source of light or pattern-emitting device. In some embodiments, the speaker 332 is an array of speakers, such as voice coils, tweeter speakers, piezoelectric speakers, and the like, and may be capable of producing sounds at any suitable frequency and having any suitable amplitude. For example, the sounds may be produced at a varying time interval representative of a synchronization signature or fingerprint, to facilitate the subsequent synchronization. In some embodiments, the light source 334 is one or more LED lights having a predetermined wavelength. In other embodiments, the light source 334 is one or more lights of any other suitable technology with variable wavelength and/or amplitude. In still further embodiments, the light source 334 is a screen of any suitable technology. In another embodiment, the light source 334 is more of an image source, for instance a screen displaying a QR-code or time value, which reflects and/or diffuses ambient light without emitting its own light. For simplicity, the expression light source 334 is used although 334 may be an image source 334.

The timing information module 314 is configured for associating the timing information to the generation of timing markers by the marker generation module 312 and with the motion data produced by the motion sensor unit 325. In some embodiments, the timing information module 314 is configured for causing the motion sensor unit 325 to begin capturing motion data. In other embodiments, the input module 320 is configured for causing the motion sensor unit 325 to begin capturing motion data. Additionally, in some embodiments the timing information module 314 is configured for providing timing information to the motion sensor unit 325, so that the motion data can be stored in association with the timing information, along with the time location of the timing markers. In other embodiments, the timing information module 314 receives the motion data from the motion sensor unit 325 and stores it in the database 316 in association with the timing information.

The motion sensor unit 325 is configured for capturing motion data, for example in accordance with step 104. The motion sensor unit 325 may obtain timing information from the timing information module 314, and causes the motion data to be stored in the database 316 as paired with the timing information, including the time location of the timing marker(s). In some embodiments, the motion data is a motion data stream forming a timeline featuring the timing markers. In some embodiments, the motion sensor unit 325 writes directly to the database 316, and writes at least the motion data, and optionally the timing information. In other embodiments, the motion sensor unit 325 writes the motion data to the database 316 and the timing information module 314 associates the timing information with the motion data in the database 316. In further embodiments, the motion sensor unit 325 captures the timing information and sends it to the timing information module 314.

The database 316 can be any database suitable for the storage of information, in this case motion data in association with timing information. For example, the database 316 can be an internal storage device, a removable storage device, such as an SD card or a USB memory stick, or any suitable combination thereof. The interface 318 can be any suitable wired or wireless interface for the transmission of information. The interface 318 is configured for providing the motion data and the timing information to the synchronization device 340. In some embodiments, the interface 318 is provided by displacing the database 316 from the motion capture device 310 to the synchronization device 340, for example by moving the SD card.

The input module 320 is configured to receive a user input indicating that capture of motion data and production of the audio and/or visible signals should be performed. The user input can be received by way of an optional button 322 or other input device (switch, touchscreen, knob, etc.), or via a wired or wireless connection to which the input module 320 can be connected.

The synchronization device 340 may comprise an audio/visual (A/V) marker detection module 342, optionally a synchronization module 344, and an interface 348. The synchronization device 340 is configured for receiving an audio/video stream from the recording device 350 as well as motion data from the motion capture device 310, and for providing outputs to the audio/video system 360 and the motion simulator 370 via the effect generation module 345 and the output interface 346. In some embodiments, the synchronization device 340 receives the audio/video stream from the recording device 350 by providing the synchronization device 340 with an SD card or other removable memory device having stored thereon the audio/video stream. The synchronization device 340 can thus be configured to search through directories on the removable memory device to find the audio/video stream.

The A/V marker detection module 342 is configured for processing the audio/video stream received from the recording device 350 to detect the timing marker(s), in accordance with step 106. Thus, the A/V marker detection module 342 is configured for performing suitable audio and/or video analysis and processing techniques to detect representations of the timing marker(s) generated by the marker generation module 312 and recorded by the recording device 350. The A/V marker detection module 342 then indicates the presence of the timing marker(s) to the synchronization module 344, and in some embodiments stores the timing marker(s) information in a database (not illustrated). In an embodiment, the synchronization device 340 may perform the synchronization using the audio stream from the recording device absent captured timing information, whereby the A/V marker detection module 342 may be bypassed or may be absent. In some embodiments, the timing markers are detected substantially automatically. In other embodiments, the timing markers are manually marked, as approximations, in the audio/video stream, for example to reduce the processing time. Processing techniques to detect timing markers may include various signal processing methods, such as audio signal filtering, or using a trained artificial neural network for sound or visual feature extraction and recognition.

The interface 348 can be any suitable wired or wireless interface for the transmission of information. The interface 348 is configured for receiving the motion data and the timing information from the motion capture device 310 and for providing the motion data and the timing information to the synchronization module 344, or to output the motion data and timing information with the audio/video stream processed by the A/V marker detection module 342, indicating the timing marker(s). Such an output could be used by the effect generation module 345 or the output interface 346 to synchronize motion data with audio/video stream. Additionally, the interface 348 is configured for sending a request for the motion data and the timing information to the interface 318 of the motion capture device 310. In some embodiments, the interface 348 is substantially identical to the interface 318.

The synchronization module 344 is configured for obtaining the motion data and the timing information from the interface 348 and for obtaining the timing marker(s) from the A/V marker detection module 342 (or optionally from a database in which the timing marker(s) is stored), and may be present in the synchronization device 340 or in any other downstream device if the synchronization device 340 outputs the motion data with timing information and the processed audio/video stream separately. The synchronization module 344 is further configured for synchronizing the motion data with the audio/video stream, in accordance with step 108. More specifically, the synchronization module 344 is configured for synchronizing the motion data with the audio/video stream by aligning the data points in the motion data with the data points in the audio/video stream based on the timing information and the timing marker(s). The synchronization module 344 is also configured to provide the synchronized motion data to the output interface 346 in the absence or by bypassing the effect generation module 345, and in some embodiments stores the synchronized motion data in a database (not illustrated). In some embodiments, the functionality of the synchronization module 344 is provided in the A/V marker detection module 342, in the effect generation module 345 or in the output interface 345, described in greater detail hereinbelow.

For instance, the following tables are exemplary of the detection from the A/V marker detection module 342, capture motion data with the timing markers, and adjusted motion data output by the synchronization module 344 to match the captured audio/video stream.

| Recorded Video and Detected Markers from 342 | | | | | | | | | | | | | |
|---|---|---|---|---|---|---|---|---|---|---|---|---|---|
| Recorded Video | Frame 1 | Frame 2 | Frame 3 | Frame 4 | Frame 5 | Frame 6 | Frame 7 | Frame 8 | Frame 9 | Frame 10 | Frame 11 | Frame 12 | Frame 13 |
| Detected Marker in Video | | | | | Marker 1 | | | | Marker 2 | | | | |
| Recorded Video | | | Frame 14 | Frame 15 | Frame 16 | Frame 17 | Frame 18 | Frame 19 | Frame 20 | Frame 21 | Frame 22 | Frame 23 | Frame 24 |
| Detected Marker in Video | | | | | | Marker 4 | | | | Marker 5 | | | |

| Captured Motion Data from Motion Sensor 325 and Timing Information Module 314 | | | | | | | | | | | | |
|---|---|---|---|---|---|---|---|---|---|---|---|---|
| Captured Motion Data | Motion 1 | Motion 2 | Motion 3 | Motion 4 | Motion 5 | Motion 6 | Motion 7 | Motion 8 | Motion 9 | Motion 10 | Motion 11 | Motion 12 |
| Motion Data Marker | Marker 1 | | Marker 2 | | Marker 3 | | Marker 4 | | Marker 5 | | Marker 6 | |

| Motion Data Adjusted by Synchronization Module 344 to Match Recorded Video | | | | | | | | | | | | |
|---|---|---|---|---|---|---|---|---|---|---|---|---|
| Adjusted Motion Data | Padding | Padding | Padding | Padding | Motion 1 | Motion 1 | Motion 2 | Motion 2 | Motion 3 | Motion 3 | Motion 4 | Motion 4 | Motion 5 |
| Motion Data Marker | | | | | Marker 1 | | | | Marker 2 | | | | Marker 3 |
| Adjusted Motion Data | | Motion 5 | Motion 6 | Motion 6 | Motion 7 | Motion 7 | Motion 8 | Motion 8 | Motion 9 | Motion 9 | Motion 10 | Motion 10 |
| Motion Data Marker | | | | Marker 4 | | | | Marker 5 | | | | |

The effect generation module 345 may generate a motion simulation track based on the synchronized motion data, for example as in step 108. The effect generation module 345 may simulate or approximate actions occurring in the motion data, as opposed to reproducing the motion data. According to an embodiment, the effect generation module 345 retrieves motion samples from a motion sample database (not shown) as a function of the analysis of the data points of motion data (e.g., magnitude, direction). Alternatively, the motion simulation track may be generated at the motion platform using the motion data as synchronized with the audio/video stream in step 108. In some embodiments, the effect generation module 345 is configured for performing the synchronization of the motion data with the audio/video stream based on the information provided by the A/V marker detection module 342.

In accordance with yet another embodiment, the effect generation module 345 may also or alternatively generate the motion simulation track using the audio/video stream. A processing of the images of the video stream may enable the detection of actions such as jump and landing, or a turn, etc., and may therefore be used for the generation of a motion simulation track. The audio stream may be used in conjunction with the processing of the images of the video stream to help detect the actions occurring in the audio/video stream. Therefore, in some embodiments, the motion simulation track may be generated by the effect generation module 345 using solely the audio/video stream. In such a case, the synchronization device 340 may act as a pass-through device for the audio/visual stream, with the effect generation module 345 optionally delaying the output of the audio/visual stream to the audio/video system 360 if time is required to process the audio/visual stream to generate the motion simulation track. In some embodiments, if no timing markers are present in the audio/video stream, an approximated synchronization can be performed based on time-stamps for the digital file containing the audio/video stream and for the digital file containing the motion data. The approximated synchronization can then be refined by using the image processing techniques discussed hereinabove.

The output module or interface 346 is configured for receiving the synchronized motion data from the synchronization module 344 (or optionally from a database in which the synchronized motion data is stored) via the effect generation module 345 and optionally for receiving the audio/video stream from the recording device 350. The output module 346 is further configured for outputting the synchronized motion data or simulation motion track to the motion simulator 370, and for optionally outputting the audio/video stream to the audio/video system 360. For example, as per step 110, the synchronization device 340 may output the motion data or motion simulation track only, but in synchrony with the audio/video stream being played back in parallel. For example, the audio/video stream may be output directly to the audio/video display system 360, with the synchronization device 340 using a parallel audio/video stream for processing. The output module 346 can output the audio/video stream in any suitable format, for example MPEG (Moving Picture Experts Group) format. Additionally, the output module 346 can output the synchronized motion data in any suitable format.

In another embodiment, the motion data can be output in the form of a motion code file with a respective fingerprint file associated with the audio/video stream. The motion code file can then be sent to a remote repository, for example a cloud-based storage system, for later synchronization of the motion data by fingerprint recognition of reproduced audio/video stream.

In some alternative embodiments, the motion capture device 310 includes one or more audio recording devices, for example one or more microphones. The motion data is captured by the motion sensor unit 325 and is stored in association with recorded audio information captured by the audio recording devices, which serves as the timing information. The synchronization module 344 of the synchronization device 340 then performs synchronization by matching the audio stream from the audio/video stream provided by the recording device 350 with the recorded audio information obtained by the microphones of the motion capture device. Thus, the A/V marker detection module 342 is bypassed, and the synchronization module 344 can extract an audio track from the audio/video stream and process it to obtain a sound fingerprint representative of the audio recording. The synchronization module 344 can use the audio track and the recorded audio information to synchronize the motion data with the audio/video stream. The timing information provided by the motion capture device 310 may include the audio track captured by the motion capture device 310, and may be processed by the timing information module 314 to obtain a sound fingerprint similar to the one processed by the synchronization module 344. Digital audio signal correlation techniques can also be used to establish the relative timing difference between the two audio streams and perform synchronization. Alternatively, the raw audio recording the motion capture device 310 is the timing information, and the processing thereof is done by the synchronization module 344. In such embodiments, as no timing markers are present, the approximated synchronization performed based on timestamps for the digital file containing the audio/video stream and for the digital file containing the motion data can be used to assist in accelerating the synchronization.

In another alternative embodiment, a single module, for example the synchronization device 340, is configured for independent operation. That is to say, the synchronization device 340 is configured for obtaining motion data from any suitable source, for example from a remote server or storage device, and for obtaining an audio/video stream from any suitable source, for example from the aforementioned remoter server or storage device. The obtained motion data is associated with timing information, for example a timing of produced timing markers, and the audio/video stream contains therein timing markers. The synchronization device 340 is configured for synchronizing the motion data with the audio/video stream in any suitable way, as described hereinabove, for example by aligning timing markers, comparing GPS clock timestamps, and the like. In some instances, the synchronization can apply a predetermined offset between the motion data and the audio/video stream, for example based on known capture delays of the devices performing the capture of the motion data and/or the audio/video stream. It should be noted that in some cases, the offset can be null.

In a further alternative embodiment, the synchronization device 340 decodes the timing information and/or the timing markers in the motion data and the audio/video stream to obtain timeline information for the motion data and the audio/video stream. The timeline information situates one or more portions of the motion data and/or the audio/video stream on a timeline, for example a start point, a first or $n^{th}$ timing marker, and the like. For example, the timeline information can be based on GPS time, obtained from a GPS clock. Synchronization of the motion data with the audio/video stream can then be performed by matching the motion data with the timeline for the audio/video stream, or vice-versa, and can incorporate an offset, as appropriate.

Various aspects of the method and system for capturing and synchronizing motion data with an audio/video stream disclosed herein may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole. According to an embodiment, the problem the claimed method and system aim to resolve is the synchronization with motion sensor data with audio and/or video stream, for instance when taken from two independent entities (e.g., two devices, two softwares or applications of a device, etc).

For example, in accordance with an embodiment in which GPS clocks are used, there may be performed a method for synchronizing motion data with an audio/video stream, comprising: a. obtaining motion data with at least one associated/embedded timing marker, which may include (i) obtaining the motion timing marker and decoding a time information value (TimeM); b. obtaining audio/video data with at least one associated/embedded timing marker, which may include (i.) obtaining the A/V timing marker and decoding a time information value (TimeAV); c. synchronizing (i) the motion data with the A/V data by matching TimeM values on the timeline created by TimeAV values, or (ii) the A/V data with the motion data by matching TimeAV values on the timeline created by TimeM values. Optionally, the matching of the method may be offset by a predefined time value.

The invention claimed is:

1. A method for synchronizing motion data with an audio/video stream, comprising:
   obtaining the audio/video stream, the audio/video stream comprising at least one timing marker produced by a motion capture device, the at least one timing marker being at least one audible representation and/or at least one visual representation in the audio/video stream;
   processing the audio/video stream to detect the at least one audible representation and/or the at least one visual representation in the audio/video stream;
   obtaining motion data associated with the audio/video stream and captured by the motion capture device, and timing information for the motion data, the timing information related to the at least one timing marker; and
   outputting the audio/video stream with the at least one timing marker detected, and motion data with said timing information.

2. The method of claim 1, wherein obtaining the motion data comprises capturing the motion data via at least one motion sensor of the motion capture device, starting substantially contemporaneously with the producing the at least one timing marker.

3. The method of claim 2, wherein synchronizing the motion data with the audio/video stream comprises aligning data points of the motion data with the at least one timing marking in the audio/video stream.

4. The method of claim 3, wherein aligning data points of the motion data with the at least one timing marking in the audio/video stream comprises aligning a zero-point of the motion data with a corresponding zero-point of the audio/video stream.

5. The method of claim 1, further comprising synchronizing the motion data with the audio/video stream based on the timing information and the at least one timing marker detected in the audio/video stream, whereby outputting the audio/video stream includes outputting the motion data synchronized with the audio/video stream.

6. The method of claim 5, wherein synchronizing the motion data comprises producing a synchronized-motion file by altering the timing information of the motion data to align with the audio/video stream based on the at least one timing marker.

7. The method of claim 5, further comprising producing a timing file comprising a mapping of the motion data to the audio/video stream based on the synchronizing.

8. The method of claim 1, further comprising outputting the motion data synchronized with a playback of the audio/video stream.

9. The method of claim 8, wherein outputting the motion data comprises causing movement in at least one motion system based on the motion data.

10. The method of claim 1, further comprising producing a motion file comprising instructions for causing movement in at least one motion system, the motion file based on the motion data and aligned with the audio/video stream.

11. The method of claim 1, further comprising producing at least one timing marker with the motion capture device for capture in the audio/video stream when obtaining the audio/video stream.

12. The method according to claim 11, wherein producing the at least one timing marker comprises producing the at least one timing marker in response to a user input.

13. The method of claim 1, wherein outputting the audio/video stream with the at least one timing marker detected includes adjusting the timing information of the motion data and outputting the adjusted motion data synchronized with the audio/video stream.

14. A synchronization device for synchronizing motion data with an audio/video stream, comprising:
 a marker detection module for
  obtaining an audio/video stream comprising at least one timing marker produced by a motion capture device, the at least one timing marker being at least one audible representation and/or at least one visual representation in the audio/video stream; and for
  processing the audio/video stream to detect the at least one audible representation and/or the at least one visual representation in the audio/video stream; and
 a synchronization module for
  obtaining motion data associated with the audio/visual stream and captured by the motion capture device, and timing information for the motion data, the timing information related to the at least one timing marker; and for
  synchronizing and outputting the motion data with audio/visual stream by aligning data points of the motion data with the audio/video stream using the timing information and the identified at least one timing marker.

15. The synchronization device of claim 14, wherein synchronizing the motion data comprises producing a synchronized-motion file by altering the timing information of the motion data to align with the audio/video stream based on the at least one timing marker.

16. The synchronization device of claim 14, the synchronization device further configured for producing a timing file comprising a mapping of the motion data to the audio/video stream based on the synchronizing.

17. The synchronization device of claim 14, the synchronization device further configured for outputting the motion data synchronized with a playback of the audio/video stream.

18. The synchronization device of claim 17, wherein outputting the motion data comprises causing movement in at least one motion system based on the motion data.

19. The synchronization device of claim 14, the synchronization device further configured for producing a motion file comprising instructions for causing movement in at least one motion system, the motion file based on the motion data and aligned with the audio/video stream.

20. The synchronization device of claim 14, wherein the synchronization module for synchronizing the motion data comprises aligning data points of the motion data with the at least one timing marking in the audio/video stream.

21. The synchronization device of claim 20, wherein aligning data points of the motion data with the at least one timing marking in the audio/video stream comprises aligning a zero-point of the motion data with a corresponding zero-point of the audio/video stream.

22. A synchronization system for synchronizing motion data with an audio/video stream, comprising:
 a synchronization device according to any one of claim 14; and
 a motion capture device, comprising:
  a timing marker generator for producing the at least one timing marker for capture in the audio/video stream; and
  a motion sensor for capturing the motion data, starting substantially contemporaneously with the producing of the timing marker.

23. The synchronization system of claim 22, wherein the motion capture device further comprises a user input, wherein the timing marker generator is configured for producing the at least one timing marker in response to actuation of the user input.

* * * * *